United States Patent
Vermeulen et al.

(10) Patent No.: US 8,069,325 B2
(45) Date of Patent: Nov. 29, 2011

(54) REGION PROTECTION UNIT, INSTRUCTION SET AND METHOD FOR PROTECTING A MEMORY REGION

(75) Inventors: Hubertus G. H. Vermeulen, Eindhoven (NL); Nagaraju Bussa, Hyderabad (IN); Udaya Seshua, Bangalore (IN)

(73) Assignee: NXP B.V., Eindhoven (NL)

( * ) Notice: Subject to any disclaimer, the term of this patent is extended or adjusted under 35 U.S.C. 154(b) by 690 days.

(21) Appl. No.: 12/161,278

(22) PCT Filed: Jan. 16, 2007

(86) PCT No.: PCT/IB2007/050140
§ 371 (c)(1),
(2), (4) Date: Jul. 28, 2008

(87) PCT Pub. No.: WO2007/083267
PCT Pub. Date: Jul. 26, 2007

(65) Prior Publication Data
US 2010/0223438 A1    Sep. 2, 2010

(30) Foreign Application Priority Data
Jan. 17, 2006   (EP) .................................... 06100454

(51) Int. Cl.
G06F 12/00   (2006.01)
G06F 13/00   (2006.01)
G06F 13/28   (2006.01)
(52) U.S. Cl. ........................................ 711/163; 711/170
(58) Field of Classification Search .......... 711/163–164, 711/170
See application file for complete search history.

(56) References Cited

U.S. PATENT DOCUMENTS

| 3,827,029 A | 7/1974 | Schlotterer et al. |
| 2002/0199076 A1 | 12/2002 | Fujii |
| 2006/0149911 A1* | 7/2006 | Kimelman et al. ........... 711/163 |
| 2008/0276051 A1* | 11/2008 | Renno ............................ 711/154 |
| 2009/0150645 A1* | 6/2009 | Ono et al. ...................... 711/209 |
| 2009/0210644 A1* | 8/2009 | Batifoulier et al. ........... 711/163 |

FOREIGN PATENT DOCUMENTS

| EP | 0700002 A1 | 3/1996 |
| EP | 1182571 A | 2/2002 |
| GB | 2325061 A | 11/1998 |

OTHER PUBLICATIONS

Tanenbaum, Andrew, Structured Computer Organization, 1984, Prentice Hall, pp. 10-12.*
Arm Limited, ARM 1156T2F-S Technical Reference Manual, 2005-2007, http://www.arm.com/documentation/ARMProcessor_Cores/index.html.

* cited by examiner

Primary Examiner — Jared Rutz
Assistant Examiner — Ryan Bertram (57) ABSTRACT

A memory region protection unit is disclosed that comprises a first register for storing a memory region address, a second register for storing the memory region size, an arithmetic function block for executing an arithmetic function on a memory address provided to the region protection unit and the address value in the first register. The unit further has a comparator for comparing the output of the arithmetic function block with the size value in the second register, the comparator being coupled to an output for signalling the validity of the memory address on the bus The region protection unit has a controller configured to retrieve the memory region address and the memory region size from instructions issued to the region protection unit for associating the unit with said region, and to dissociate the unit from its memory region in response to a further instruction.

14 Claims, 3 Drawing Sheets

REGION PROTECTION UNIT, INSTRUCTION SET AND METHOD FOR PROTECTING A MEMORY REGION

The present invention relates to a region protection unit for protecting a region of a memory.

The present invention further relates to an integrated circuit (IC) arrangement including a plurality of region protection units.

The present invention yet further relates to an instruction set for such an IC arrangement.

The present invention yet further relates to a method for protecting a region of a memory.

To meet the demanding requirements for audio and video appliances, the industry is moving towards the integration of a complete system on a single chip, a so-called system-on-chip (SoC), or in a single package, such as a so-called system-in-package (SiP). Today, a typical SoC already comprises multiple, possibly heterogeneous processor cores and dedicated hardware peripherals. On top of this hardware, several layers of software (drivers, operating system, streaming and control layers) are stacked to build a complete audio/video application for use in domestic and mobile appliances.

The development of such a complex SoC application includes the need to verify its correctness. In the industry, a trend is visible showing that it becomes increasingly more difficult to debug the embedded software for these applications. It is typically difficult to quickly and easily locate errors in the software running on top of a SoC because of the limitations to the observability of the operation of each software component. As a result, this task becomes more costly. At present, the industry spends on average 50% of the total project time on post-silicon debug of both hardware and software. With increasing time-to-market pressure, it becomes more important to reduce the amount of time and resources spent on software debug on silicon.

An example of an IC architecture providing protection against illegal memory accesses, which typically cause a (run-time) error in the software running on such an architecture, is disclosed in ARM Ltd.: "ARM 1156T2F-S Technical Reference Manual", 2005, as retrieved from the internet (http://www.arm.com/documentation/ARMProcessor-_Cores/index.html) on Nov. 1, 2006. The ARM 1156T2-F-S processor includes a memory protection unit implemented in hardware, in which a memory is divided in contiguous regions. The memory protection unit stores a base address, as well as a five-bit value corresponding to the region size for each region in a look-up table (LUT). For each memory access, the LUT has to be checked to locate the corresponding region. Similarly, upon a memory (de) assignment, the appropriate entries in the LUT have to be (re)set. The operation of such a memory protection architecture can be time-consuming, and lacks flexibility due to the fact that the memory has to be divided into contiguous regions of equal size, each starting at fixed memory locations.

The present invention seeks to provide improved debugging capabilities for integrated circuit arrangements that will lead to a shorter software application development time for such arrangements. More specifically, the present invention seeks to provide a method and infrastructure for debugging run-time memory corruption problems during post-silicon application development.

According to a first aspect of the present invention, there is provided a memory region protection unit (RPU) comprising a first register for storing a memory region bound address; a second register for storing a memory region size; an arithmetic function block for executing an arithmetic function on a memory address provided to the region protection unit and the address value in the first register; a comparator for comparing the output of the arithmetic function block with the size value in the second register, the comparator being coupled to an output for signalling the validity of the provided memory address; and a controller being configured to store the memory region bound address for the first register and the memory region size for the second register in response to one or more instructions issued to the RPU for associating the region protection unit with said region; and to dissociate the region protection unit from said region in response to a further instruction issued to the RPU.

Such a RPU has the advantage that it can be configured using appropriate instructions in software, which improves the flexibility of the protection unit, for instance in terms of the size of the memory region associated with the unit, whereas it shows good performance during operation due to the fact that the memory protection algorithm is realized in hardware.

The RPU may further comprise a multiplexer responsive to the controller, the multiplexer having a first input coupled to the second register, a second input coupled to a value indicating a maximum region size and an output coupled to the comparator. This further enhances the flexibility of the RPU, because various RPUs can be configured, or designed, to protect various sized memory regions, as indicated by the specified maximum size. The suitability of a RPU to protect a memory region in terms of size can be checked with a dedicated instruction that invokes a comparison of the given maximum size with the region size provided to the RPU.

The RPU may be associated with heaps as well as stacks. For the latter, the RPU may further comprise a further register for storing a function scope identifier, the arithmetic function block further being arranged to execute the arithmetic function on a further function scope identifier provided to the region protection unit and the identifier stored in the further register; and wherein the multiplexer has a third input coupled to a fixed value source. This way, appropriate RPUs can be found and/or dissociated from a stack by providing all RPUs with a function scope identifier and comparing the provided identifier with the value stored in the further register.

Advantageously, the first register and the further register are coupled to the arithmetic function block via a further multiplexer responsive to the controller. This enables facile selection of the appropriate register by the controller.

In a preferred embodiment, the RPU further comprises an OR gate having a first input coupled to an output of the comparator, a second input coupled to an output of the controller and an output coupled to the region protection unit output. This facilitates coupling such an RPU in a daisy chain of RPUs. For instance, as soon as one of the RPUs detects a valid address, a signal indicating this event can be rippled through the controllers of the RPUs via the OR gates, with the output of the final RPU in the daisy chain signalling the valid association of a memory region including the verified address to one of the RPUs in the daisy chain.

According to a further aspect of the invention, there is provided an integrated circuit arrangement comprising a data communication bus; a memory arrangement coupled to said bus having a plurality of regions for storing data; a processing unit coupled to said bus for processing said data; a plurality of RPUs of the present invention, each RPU being associable to a region of the memory arrangement; and a RPU controller coupled between said bus and the plurality of RPUs for controlling access of the processing unit to the memory arrangement, the RPU controller being configured to communicate said instructions between the processing unit and the plurality of RPUs.

The IC arrangement of the present invention, which may be a single die based IC such as a SoC or an assembled product such as a SiP, comprises a hardware (HW)/software (SW) hybrid solution for the protection of the memory arrangement, which may comprise a single memory or a plurality of memories. The hybrid solution ensures that during operation, e.g. debug, the memory protection architecture has little overhead on the performance of the IC arrangement at the expense of limited HW area overhead for the RPUs and the RPU controller.

Preferably, the plurality of region protection units are organized in a daisy chain, with a controller of a successor region protection unit having an input coupled to an output of the controller of a predecessor region protection unit, the output of the controller of the last region protection unit in the daisy chain being coupled to the region protection unit controller. This facilitates the broadcast of a single instruction from the RPU controller to all daisy-chained RPUs, with the output of the last RPU in the chain for instance signalling the presence or absence of a condition, e.g. an memory address within a region guarded by one of the RPUs, to the RPU controller due to the fact that this condition is cascaded through the daisy-chained path of the controllers inside the RPUs.

In an embodiment, a first part of the daisy chain comprises a first part of the plurality of the region protection units, each unit from the first part being associable with a heap region of the memory arrangement, and wherein a second part of the daisy chain comprises a second part of the plurality of the region protection units, each unit from the second part being associable with a stack region of the memory arrangement. The IC arrangement of the present invention allows for the protection of mixed memory architectures, i.e. architectures in which both heaps and stacks are used; this can be facilitated by using different types of RPUs each optimized for the type of memory region to be protected.

According to another aspect of the invention, there is provided a software program for execution by the processing unit in the integrated circuit arrangement of the present invention, the program comprising a first instruction for associating a region protection unit from the plurality of region protection units to a region of the memory arrangement; the first instruction comprising a parameter defining the size of said region; a first further parameter for providing the associated region protection unit with a lower bound address of said region; a second instruction, comprising a parameter defining a memory address value, for instructing the plurality of region protection units to check whether said memory address value lies within the region associated with each respective unit; and a third instruction, comprising a parameter corresponding to a characteristic of a region of the memory arrangement, for dissociating a region protection unit from said region. Such a software program, which may be stored on a computer-readable storage medium such as a CD-ROM, DVD, memory stick, internet-accessible database and so on, facilitates high-speed memory protection on an IC arrangement of the present invention.

The first instruction may further comprise a second further parameter defining a function scope identifier for use with RPUs that protect stack-based memory regions, which are typically associated with a predefined function scope. The first instruction may comprise the first further and second further parameter; alternatively, the first further and second further parameter may be comprised by one or more separate instructions, such as a first dedicated instruction for providing the bound address and a second dedicated instruction for providing the function scope identifier.

The characteristic of the parameter of the third instruction may be a memory (bound) address or a function scope identifier, which enables the RPU to identify its dissociation instruction.

According to yet another aspect of the invention, there is provided a method for protecting a region of a memory arrangement, comprising providing an integrated circuit arrangement of the present invention; allocating a memory region to the processing unit for the execution of a predefined function by issuing a first instruction to the region protection unit controller, said instruction comprising the size of the memory region; forwarding the instruction to the plurality of region protection units to check the availability of a region protection unit to protect said memory region; and in case a region protection unit is available: associating the available region protection unit with the memory region by storing the size of the memory region in its second register; providing the region protection unit with a bound address of said memory region; and storing the bound address in its first register; in case a region protection unit is unavailable, providing a signal indicating the unavailability of said region protection unit. This method facilitates run-time memory protection at the cost of only little hardware and performance overhead.

The method may further comprise the steps issuing a memory access instruction to the region protection unit controller, said instruction comprising a parameter corresponding to an address of the memory arrangement; forwarding said access instruction to the plurality of region protection units to check whether said address lies inside a region of the memory arrangement associated with any of the region protection units; and providing an indication of the validity of said address. This facilitates rapid detection of illegal memory accesses by, for instance, the software running on the processing unit.

The method may further comprise the steps of deallocating a memory region used by the processing unit upon completion of the execution of a predefined function by the processing unit by issuing a further instruction to the region protection unit controller, said instruction comprising a parameter corresponding to a characteristic of a region of the memory arrangement, for dissociating a region protection unit from said region; forwarding the further instruction to the plurality of region protection units to check the association of a region protection unit to the memory region; and in case a region protection unit is associated to the memory region, dissociating the region protection unit from the memory region. This facilitates efficient deallocation of RPU resources from the memory protection architecture, for instance by providing the bound address of the memory region, an address within a protected memory region or a function scope identifier as the parameter of the further instruction.

The invention is described in more detail and by way of non-limiting examples with reference to the accompanying drawings, wherein.

It should be understood that the Figures are merely schematic and are not drawn to scale. It should also be understood that the same reference numerals are used throughout the Figures to indicate the same or similar parts.

Figure 1:
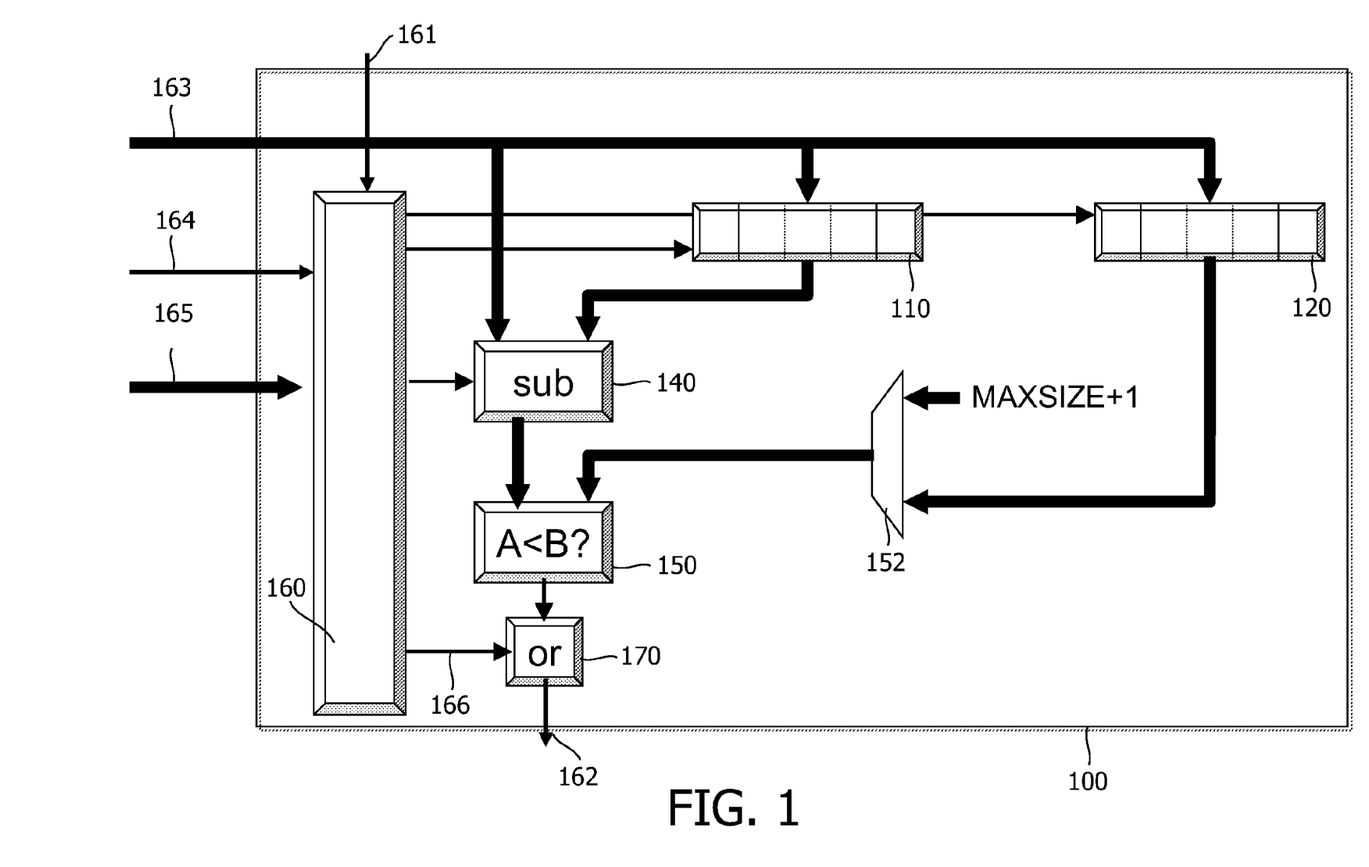
FIG. 1 depicts an embodiment of a RPU of the present invention.

FIG. 1 shows a first embodiment of a RPU 100 according to the present invention. The RPU 100 has a first register 110 and a second register 120 coupled to a data line, e.g. a data communication bus 163. The first register 110 stores a bound address value of the memory region the RPU 100 is associated with, i.e. an address value that defines a lower or a higher boundary of the memory region, and the second register 120 stores the size of this memory region. The RPU 100 further comprises an arithmetic functional block 140, e.g. a subtraction unit, having a first input coupled to the data communication bus 163 and a second input coupled to the first register 110. The output of the arithmetic functional unit 140 is coupled to an input of a comparator 150, which has a further input coupled to the second register 120. The output of the comparator 150 is coupled to RPU output 162 via an optional OR gate 170. The RPU 100 has a controller 160 for configuring the first register 110 and the second register 120. The controller is coupled to RPU input 161, clock signal line 164 and data input line 165, over which the controller 160 can receive configuration and operation instructions from an external circuit such as a processing unit (not shown). The RPU comprises a multiplexer (MUX) 152 under control of the controller 160, with MUX 152 having a first input coupled to the second register 120, a second input coupled to a predefined value MAXSIZE+1 that defines the maximum size of a memory region that the RPU 100 can protect and an output coupled to the further input of the comparator 150. Alternatively, MAXSIZE+1 may be hard-coded into the controller 160 or the comparator 150. The hardware-based RPU 100 is controlled by appropriate software, i.e. a set of instructions, preferably grouped as an application program interface (API), to configure and operate the RPU 100. An example of a typical instruction flow and their implications on the hardware of the RPU 100 is given below.

As an initial instruction, the controller 160 may receive a reset instruction. This triggers the controller 160 to clear all internal settings of the RPU 100, such as the contents of first register 110 and second register 120 and the output signal provided at RPU output 162. Typically, the RPU 100 will comprise an internal flag (not shown) that indicates whether the RPU 100 is in use or not. This flag is reset as well upon reception of this instruction.

A next instruction may ask the RPU 100 to check if it is large enough to protect a memory region size specified in the instruction. The controller 160 will check the RPU input 161 to see if another RPU 100 has already taken on this assignment. This will be explained in more detail later. The size of the memory region to be protected is made available on the data communication bus 163, and the controller 160 will select the MAXSIZE+1 input of the MUX 152. Consequently, the comparator 150 will indicate whether or not the RPU 100 can be associated with this memory region, i.e. whether or not the RPU 100 is large enough. If so, the controller 160 will set a first internal flag (not shown) to a value indicating that the RPU 100 has accepted the assignment, and will simultaneously enforce the storage the size of the memory region to be protected in the second register 120. Optionally, the controller 160 will assert its output 166, thus leading to an asserted RPU output 162. This asserted output signals other RPUs 100 that the requested protection has been assigned. Alternatively, the asserted output of the comparator 150 may instead be used for this purpose.

Typically, the RPU output 162 of an RPU 100 is coupled to the RPU input 161 of another RPU 100. This way, a hierarchical daisy chain of RPUs can be formed.

In such a daisy chain, if more than one RPU simultaneously accept the assignment of the protection of the specified memory region, a lower ranked, i.e. successor or downstream, RPU will dissociate itself from this assignment upon receipt of an asserted output from a higher ranked, i.e. predecessor or upstream, RPU via its RPU input 161. It is important that the other (lower-ranked) RPUs receive such an asserted output signal within the next clock period to avoid the associations of multiple RPUs to a single memory region. Although the signal path between the RPUs comprises little logic, which means that a signal can reach several RPU controllers in a single clock cycle, this signal may not reach all downstream RPUs in case of a very long daisy chain. To this end, additional signal paths such as carry look-ahead signal paths may be provided to ensure the timely reception of the signals by each RPU. Such techniques are known per se, and will not be further explained for that reason.

It will be appreciated that during the execution of this function, the first register 110 should carry a zero value to let the memory region size on the data communication bus 163 pass the arithmetic function block 140 unaltered. Alternatively, the arithmetic function block 140 may be bypassed in this mode, e.g. by a set of multiplexers (not shown) around the arithmetic function block 140. Other solutions will be apparent to the skilled person.

Upon an RPU accepting the aforementioned assignment, a further instruction will be issued specifying the bound address, e.g. the lower bound address, of the memory region to be protected. This instruction will be picked up by the RPU 100 that has its first internal flag asserted; i.e. the RPU 100 that has accepted the memory protection assignment. The bound address will be provided via the data communication bus 163, and the controller 160 will force the first register 110 to capture this value. The controller 160 will set a further internal flag (not shown) to a value indicating that the RPU 100 is now in use, and will clear its first internal flag. The controller 160 does not use its input signal 161 and output signal 166 in this mode. Alternatively, the bound address may also be included in the instruction for checking whether the RPU is available for protecting a memory region, as previously explained.

Next, in check address mode, as signalled by an appropriate instruction, the RPU 100 checks if an address received via the data communication bus 163 falls inside the memory region with which the RPU 100 has been associated. To this end, the controller 160 activates the arithmetic logic block 140, which subtracts the (lower) bound address of the memory region stored in the first register 110 from the address received on the data communication bus 163. The controller 160 also selects the input of the MUX 152 that is coupled to the second register 120 to facilitate the comparator 150, which may be implemented as a subtraction unit or another suitable arithmetic function block, to compare the result of the arithmetic function block 140 with the region size value stored in the second register 120.

The output of the comparator 150 is a signal indicating that the address on the data communication bus 163 is larger than, or equal to, the lower bound address stored in the first register 110 but that the difference between these two values does not exceed the size of the memory region. Alternatively, an upper bound address may be used in register 110, in which case the comparator 150 will signal that the address on the data communication bus 163 is smaller than, or equal to the upper bound address. In short, the comparator generated signal indicates whether or not the address on the data communication bus 163 falls inside the memory region guarded by the RPU 100.

The output signal provided on RPU output 162 is the logic OR of the signal provided by the comparator 150 and the cascaded input signal received on RPU input 161. This signal will be asserted if the comparator 150 or another RPU has signalled that the address provided on data communication bus 163 falls inside its guarded memory region. This signal can be used for a number of purposes. For instance, in case of the detection of a valid address, the signal can be used to grant a memory access to the protected memory region, or it can be used to set a flag indicating that a specified address was a valid address. In contrast, for invalid addresses, the (deasserted) signal may trigger an interruption and subsequent state capture of the system the RPU architecture is a part of, for evaluation purposes, e.g. to trace back the origin of a fault leading to the specification of the invalid address.

Finally, the RPU 100 may be provided with an instruction to dissociate itself from a memory region. To this end, the data communication bus 163 will be provided with a parameter corresponding to a characteristic of this memory region, such as the bound address of a protected memory region as stored in first register 110 or an address that lies inside this region. The controller 160 of a RPU 100 that has its further internal flag asserted, i.e. the RPU 100 is in use, will instruct the arithmetic function block 140 to compare the value on the data communication bus 163 with the value stored in the first register 110. If the values match, the controller 160 will deassert its further internal flag to indicate that the RPU 100 has become available again. The controller 160 may also force a reset of the contents of the first register 110 and the second register 120.

Figure 2:
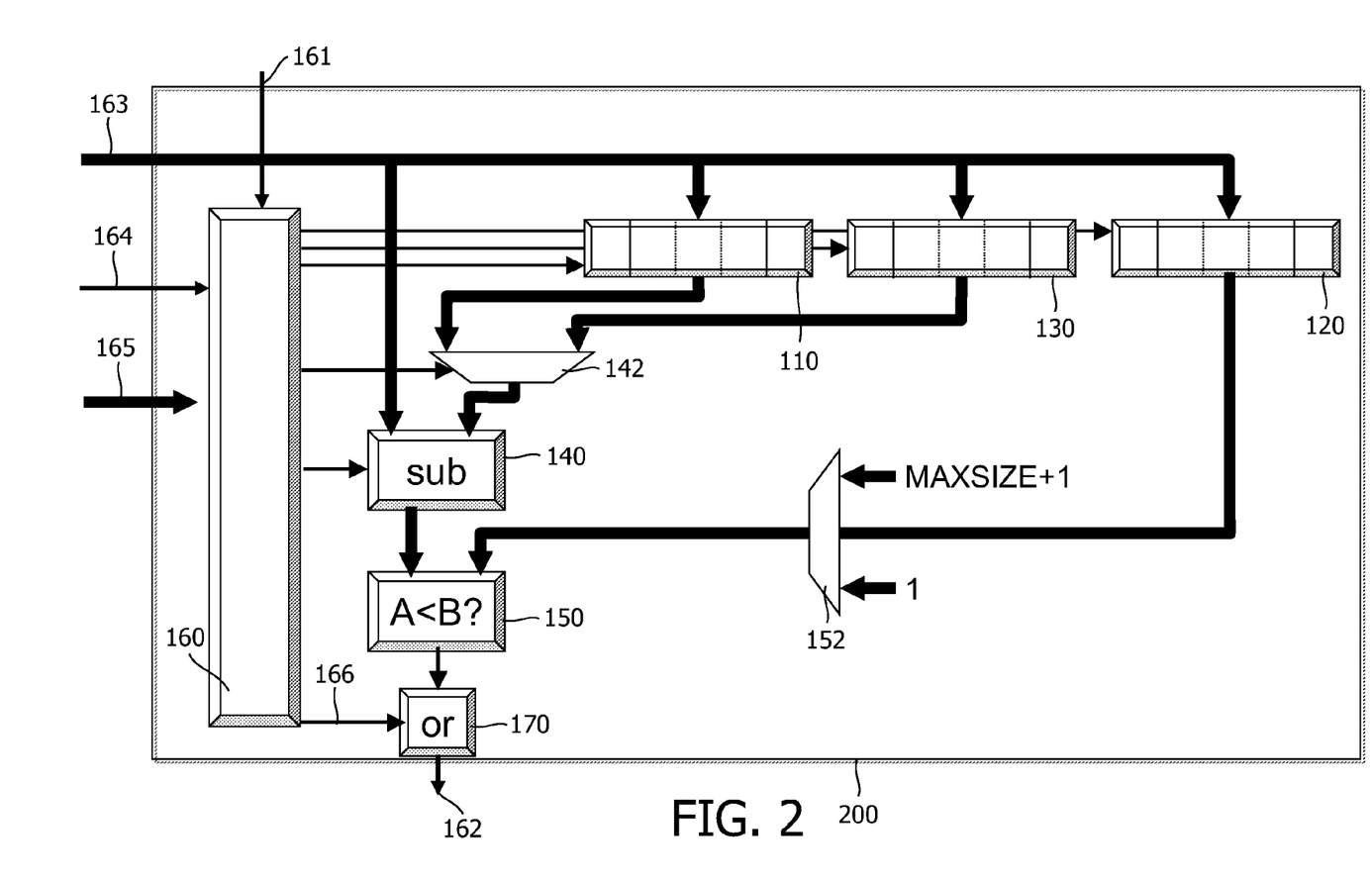
FIG. 2 depicts another embodiment of a RPU of the present invention.

The embodiment of RPU 100 is particularly suitable to protect heap-type memory regions. FIG. 2 shows an embodiment of a RPU 200 that is particularly suitable to protect stack-type memory regions. In addition to RPU 100, the RPU 200 comprises a third register 130 for storing a function identifier that is associated with the stack that the RPU 200 may be protecting. Typically, stacks are used for temporary and/or internal variables of a particular function scope. The storage of an identifier of this scope can be useful, as will be explained in more detail later. The RPU 200 further has an additional fixed value input on the MUX 152, and an additional MUX 142 under control of the controller 160 to facilitate selection between the first register 110 and the third register 130.

The RPU 200 may be reset in the same way as explained for RPU 100. The RPU 200 may be associated with a stack-type memory region with a dedicated instruction to which a RPU 100 is not sensitive. For instance, this instruction may be called when buffers are allocated on the stack, in order to assign a RPU 200 to the protection of such a buffer. The mechanism for associating a RPU 200 to a stack region is similar to the way the RPU 100 was associated to a heap-type memory region, i.e. by providing the RPU 200 with the size of the stack-type region and comparing it with its MAXSIZE+1 value and so on, and will not be further explained for that reason. Obviously, a freshly associated RPU 200 will not only be provided with the bound address of its memory region for storage in first register 110, but may also be provided with a function scope identifier for storage in third register 130. The check of whether or not an address falls inside the protected stack-type memory region is done in the same fashion as in RPU 100, and will also not be further explained.

The main difference between a heap-type RPU 100 and a stack-type RPU 200 is that for the latter type, a number of RPUs 200 may be assigned to the same function scope. The presence of the function scope identifier in the third register 130 facilitates an efficient dissociation of the RPUs 200 assigned to a single function scope. A deallocation instruction including the appropriate function scope identifier is broadcasted to all RPUs via mode select line 165 and data communication bus 163, and triggers the controller 160 in a stack-type RPU 200 to force the comparison of the value of the identifier on the data communication bus 163 to the value stored in third register 130 by activating the arithmetic function block 140 and selecting the appropriate input of MUX 142. The MUX 152 is set to its fixed value input, e.g. '1', so that if the values of the function scope identifier on the data communication bus 163 and the third register 130 are the same, the comparator 150 will produce a signal that the output of the arithmetic function block 140 is smaller than that provided by the MUX 152. This signal will trigger the controller 160 to reset its further internal flag to dissociate the RPU 200 from its memory region. Hence, a single instruction can be used to simultaneously dissociate all RPUs 200 sharing a function scope from their respective memory regions.

At this point, it is noted that the use of unsigned integers for the various parameters provided via data communication bus 163 is preferred. This for instance ensures that when a function scope identifier on the data communication bus 163 differs from the value in third register 130, the output of the arithmetic function block 140 always produces a value that is larger than the fixed value of MUX 152.

Figure 3:
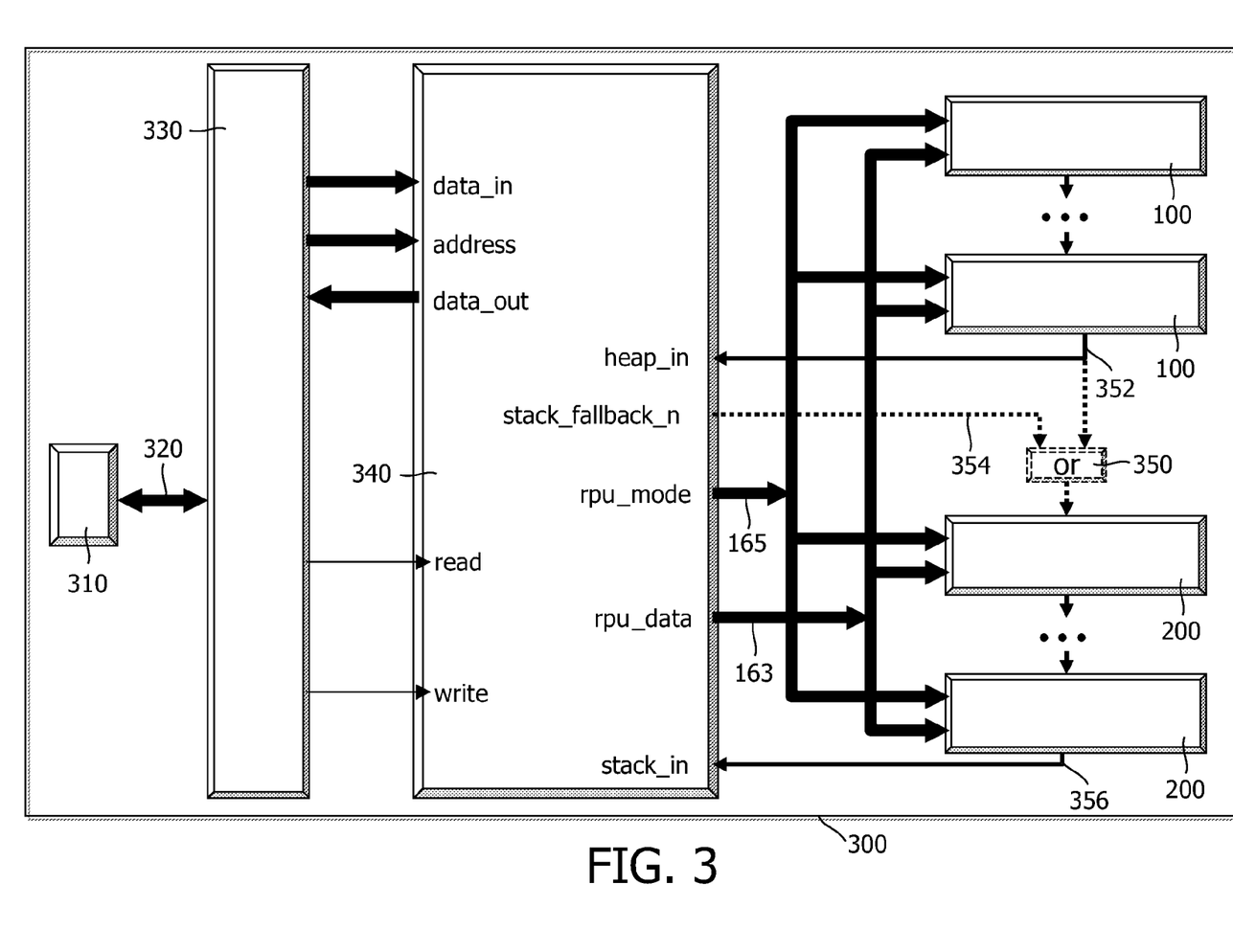
FIG. 3 depicts an embodiment of an IC arrangement of the present invention.

FIG. 3 shows an example of an IC arrangement 300 according to the present invention. The IC arrangement 300 has a processing unit 310, which may be a central processing unit or one of a plurality of processing units, which is coupled to a RPU controller 340 via a data communication bus 320 and a bus adapter 330. The RPU controller 340 is coupled to a plurality of heap-type RPUs 100 and a plurality of stack-type RPUs 200 via mode select bus 165 and data communication bus 163. The RPU controller 340 may also provide the RPUs with a clock signal via their respective clock signal lines 164 (not shown in FIG. 3 for reasons of clarity only). Alternatively, this signal may be provided by a separate clock generator (not shown). It will be appreciated that the choice for a mixture of heap-type RPUs 100 and stack-type RPUs 200 is by non-limiting example only. Alternative arrangements, e.g. having only RPUs 100 or having only RPUs 200 are equally feasible. FIG. 3 does not depict the memory arrangement of the IC arrangement 300 for reasons of clarity only.

The RPU controller 340 is arranged to handle the memory accesses of the processing unit 310 via its data_in, address, data_out, read and write ports. These ports are also used to receive the instructions from the processing unit 310 to configure and control the RPUs 100 and 200. To this end, the RPU controller 340 decodes the received instructions and provides the RPUs with a corresponding mode select instruction on the RPU mode bus 165 and forwards the parameters in the instruction received from the processing unit 310 to the RPU data communication bus 163.

At this point, it is stated that this architecture can also be used to secure data stored in the memory arrangement (not shown); the secure data is stored in unguarded memory regions, which results in access requests being denied due to the fact that the address of the secure data does not correspond with a memory region protected by any of the RPUs of the IC arrangement 300. The secure data can only be accessed by switching off the memory protection arrangement, i.e. RPU controller 340, in a dedicated mode of the IC arrangement 300.

The RPUs 100 and 200 are organized in a daisy chain via their respective RPU inputs 161 and RPU outputs 162, as previously explained. The heap-type RPUs 100 are grouped in a first part of the daisy chain, with the last RPU 100 in this chain having its output 162 coupled to the heap_in input of the RPU controller 340 via data line 352. The stack-type RPUs 200 are grouped in a second part of the daisy chain, with the last RPU 200 in this chain having its output 162 coupled to the stack_in input of the RPU controller via data line 356. The data lines 352 and 356 are used to communicate the cascaded information of the daisy chained RPUs to the RPU controller 340, such as the information that one of the RPUs has accepted the assignment of a memory region protection task, or the information that one of the RPUs has validated an address provided on the data communication bus 163, as previously explained.

It will be appreciated that stack-type RPUs 200 can also be used for protecting heap-type memory regions, since the RPU 200 is an extended version of the RPU 100. This is utilized in the IC architecture in the following way. An OR gate 350 is inserted in between the first part of the daisy chain and the second part of the daisy chain. If the stack-type RPUs 200 are not allowed to act as heap-type RPUs, the RPU controller 340 will assert the input of the OR gate 350 that is coupled, via data line 354, to the stack_fallback_n output of the RPU controller 340 in the mode in which the RPUs check whether they can associate themselves with a memory region to be protected, as previously explained. The asserted input of OR gate 350 will lead to the input 161 of the first stack-type RPU 200, which is coupled to the output of OR gate 350, receiving a signal value indicating that a higher ranked RPU has already accepted the assignment. This value will be rippled through all RPUs 200, so that none of the RPUs 200 will accept this assignment.

If, on the other hand, a RPU 200 is allowed to accept the assignment of protecting a heap-type memory region, the RPU controller will deassert the data line 354, which will allow each of the heap-type RPUs 100 and stack-type RPUs 200 to accept the assignment.

Below an example implementation is given of a C-type instruction set, as incorporated in an API, for a processing unit 310 for operating the RPU architecture of the IC arrangement 300. These instructions are examples of the previously explained instructions in the detailed descriptions of FIGS. 1 and 2.

void rpus_initialize( )

This function resets the RPU hardware, clearing all settings.

bool rpus_heap_enable(void*base, unsigned long int size)

This function is called as and when buffers are allocated on the heap by functions such as malloc and new. This function passes information such as the base address and size of the buffer. Either one of the available hardware-based RPUs 100 or 200 is programmed to protect this buffer, and a true value is returned, or a false value is returned, if no suitable RPU is available. The latter return value can be used to turn on a fallback mechanism to protect the buffer in software instead.

bool rpus_stack enable(void*base, unsigned long int size, int func_id)

Similar to the rpus_heap_enable function, this function is called as and when buffers are allocated on the stack. It communicates information such as the base and size of the stack buffer, and the identification code of the function scope in which the buffer was allocated.

bool rpus_check_access(void*pointer)

This function is called whenever there is a memory access in software. The address of the memory access is communicated to the hardware via a memory mapped input/output (MMIO) space. The function call returns either a true value if a hardware-based RPU 100 or 200 in the daisy-chain could validate the memory address by checking it against all known valid regions, or a false value, if the RPUs could not. The latter can be used to activate a software fallback to check the memory address against all regions protected in software, if additional software based protection is used.

If the complete memory protection architecture is realized in hardware, the false value returned by this instruction can be used to trigger a software debugger, indicating there is a illegal memory access. Preferably, all the above instructions communicate the relevant data to the underlying RPU hardware via a memory mapped input/output (MMIO) space.

An alternative implementation of the RPU architecture, i.e. the RPU controller 340 directly observes the bus to automatically extract the address of any transaction occurring on the bus. A second alternative implementation of the RPU controller 340 features the RPU controller 340 as a bridging module between the main processing unit 310 and the system bus 320, allowing it to monitor and conditionally pass on any memory access made by the processing unit 310.

bool rpus_heap_disable(void*base)

This function is called when a program, or a programmer, frees memory allocated on the heap. Using this call enables the RPU 100 or 200 allocated to the given base address to be freed up and used to protect a new buffer in the future. The return value is either true if an RPU 100 or 200 existed in hardware that was protecting a buffer starting at the given base address, and false if there was no such RPU. The latter can be used to only conditionally search the list of buffers protected in software and remove the appropriate RPU from that list.

void rpus_stack_disable(int function_id)

This function is called when the scope of a particular function is over. The function scope's identification code is communicated to the hardware, and in particular to stack-type RPUs 200. Using this call, any stack-type RPU 200 allocated inside this function and hence identified by the identification code (function_id) is freed up and available for future usage.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. The invention can be implemented by means of hardware comprising several distinct elements. In the device claim enumerating several means, several of these means can be embodied by one and the same item of hardware. The mere fact that certain measures are recited in mutually different dependent claims does not indicate that a combination of these measures cannot be used to advantage.

The invention claimed is:

1. A memory region protection unit comprising:
a first register for storing a memory region bound address;
a second register for storing a memory region size;
an arithmetic function block for executing an arithmetic function on a memory address provided to the region protection unit and the address value in the first register;
a comparator for comparing the output of the arithmetic function block with the size value in the second register, the comparator being coupled to an output for signalling the validity of the provided memory address; and
a controller being configured to:
store the memory region bound address in the first register and the memory region size in the second register in response to one or more instructions issued to the region protection unit for associating the region protection unit with said region; and dissociate the region protection unit from said region in response to a further instruction issued to the region protection unit.

2. A region protection unit as claimed in claim 1, further comprising a multiplexer responsive to the controller, the multiplexer having a first input coupled to the second register, a second input coupled to a value indicating a maximum region size and an output coupled to the comparator.

3. A region protection unit as claimed in claim 2, further comprising a further register for storing a function scope identifier, the arithmetic function block further being arranged to execute the arithmetic function on a further function scope identifier provided to the region protection unit and the identifier stored in the further register; and wherein the multiplexer has a third input coupled to a fixed value source.

4. A region protection unit as claimed in claim 3, wherein the first register and the further register are coupled to the arithmetic function block via a further multiplexer responsive to the controller.

5. A region protection unit as claimed in claim 1, further comprising an OR gate having a first input coupled to an output of the comparator, a second input coupled to an output of the controller and an output coupled to the region protection unit output.

6. An integrated circuit arrangement comprising:
a data communication bus;
a memory arrangement coupled to said bus having a plurality of regions for storing data;
a processing unit coupled to said bus for processing said data;
a plurality of memory region protection units, wherein a memory region protection unit comprises,
a first register for storing a memory region bound address;
a second register for storing a memory region size;
an arithmetic function block for executing an arithmetic function on a memory address provided to the region protection unit and the address value in the first register;
a comparator for comparing the output of the arithmetic function block with the size value in the second register, the comparator being coupled to an output for signalling the validity of the provided memory address; and
a controller being configured to:
store the memory region bound address in the first register and the memory region size in the second register in response to one or more instructions issued to the region protection unit for associating the region protection unit with said region; and
dissociate the region protection unit from said region in response to a further instruction issued to the region protection unit;
each region protection unit being associable to a region of the memory arrangement; and
a region protection unit controller coupled between said bus and the plurality of region protection units for controlling access of the processing unit to the memory arrangement, the region protection unit controller being configured to communicate said instructions between the processing unit and the plurality of region protection units.

7. An integrated circuit arrangement as claimed in claim 6, wherein the plurality of region protection units are organized in a daisy chain, with the controller of a successor region protection unit having an input coupled to an output of the controller of a predecessor region protection unit, the output of the controller of the last region protection unit in the daisy chain being coupled to the region protection unit controller.

8. An integrated circuit arrangement as claimed in claim 7, wherein a first part of the daisy chain comprises a first part of the plurality of the region protection units, each unit from the first part being associable with a heap region of the memory arrangement, and wherein a second part of the daisy chain comprises a second part of the plurality of the region protection units, each unit from the second part being associable with a stack region of the memory arrangement.

9. An integrated circuit arrangement as claimed in claim 6, wherein the integrated circuit arrangement comprises a system-on-chip.

10. An integrated circuit arrangement as claimed in claim 6, wherein the integrated circuit arrangement comprises a system-in-package.

11. A method for protecting a region of a memory arrangement, comprising:
providing an integrated circuit arrangement comprising:
a data communication bus;
a memory arrangement coupled to said bus having a plurality of regions for storing data;
a processing unit coupled to said bus for processing said data;
a plurality of memory region protection units, wherein a memory region protection unit comprises,
a first register for storing a memory region bound address;
a second register for storing a memory region size;
an arithmetic function block for executing an arithmetic function on a memory address provided to the region protection unit and the address value in the first register;
a comparator for comparing the output of the arithmetic function block with the size value in the second register, the comparator being coupled to an output for signalling the validity of the provided memory address; and
a controller being configured to:
store the memory region bound address in the first register and the memory region size in the second register in response to one or more instructions issued to the region protection unit for associating the region protection unit with said region; and
dissociate the region protection unit from said region in response to a further instruction issued to the region protection unit;
each region protection unit being associable to a region of the memory arrangement; and
a region protection unit controller coupled between said bus and the plurality of region protection units for controlling access of the processing unit to the memory arrangement, the region protection unit controller being configured to communicate said instructions between the processing unit and the plurality of region protection units;
allocating a memory region to the processing unit for the execution of a predefined function by issuing a first instruction to the region protection unit controller, said instruction comprising the size of the memory region;
forwarding the instruction to the plurality of region protection units to check the availability of a region protection unit to protect said memory region; and
in case a region protection unit is available:
associating the available region protection unit with the memory region by storing the size of the memory region in its second register;

providing the region protection unit with a bound address of said memory region; and storing the bound address in its first register;

in case all region protection units are unavailable, providing a signal indicating the unavailability the region protection units.

12. A method as claimed in claim 11, further comprising:

issuing a memory access instruction to the region protection unit controller, said instruction comprising a parameter corresponding to an address of the memory arrangement;

forwarding said access instruction to the plurality of region protection units to check whether said address lies inside a region of the memory arrangement associated with any of the region protection units; and in case the address lies inside a region protected by a region protection unit, providing an indication of the validity of said address.

13. A method as claimed in claim 11, further comprising:

deallocating a memory region used by the processing unit upon completion of the execution of a predefined function by the processing unit by issuing a further instruction to the region protection unit controller, said instruction comprising a parameter corresponding to a characteristic of a region of the memory arrangement, for dissociating a region protection unit from said region;

forwarding the further instruction to the plurality of region protection units to check the association of a region protection unit to the memory region; and in case a region protection unit is associated to the memory region, dissociating the region protection unit from the memory region.

14. A method as claimed in claim 12, further comprising:

deallocating a memory region used by the processing unit upon completion of the execution of a predefined function by the processing unit by issuing a further instruction to the region protection unit controller, said instruction comprising a parameter corresponding to a characteristic of a region of the memory arrangement, for dissociating a region protection unit from said region;

forwarding the further instruction to the plurality of region protection units to check the association of a region protection unit to the memory region; and in case a region protection unit is associated to the memory region, dissociating the region protection unit from the memory region.

* * * * *